United States Patent [19]

Yoshimura et al.

[11] Patent Number: 4,489,436
[45] Date of Patent: Dec. 18, 1984

[54] DEVICE FOR VOCALLY INDICATING CAUSES OF ABNORMAL CONDITIONS OF A SEWING MACHINE

[75] Inventors: Motokazo Yoshimura; Michitaka Takiguchi; Fujio Horie; Koichi Hirata, all of Nagoya, Japan

[73] Assignee: Brother Kogyo Kabushiki Kaisha, Aichi, Japan

[21] Appl. No.: 336,945

[22] Filed: Jan. 4, 1982

[30] Foreign Application Priority Data

Jan. 23, 1981 [JP] Japan .................... 56-9157
May 19, 1981 [JP] Japan .................... 56-75418

[51] Int. Cl.³ .............................................. G10L 1/00
[52] U.S. Cl. ...................................... 381/51; 112/278
[58] Field of Search ........................ 381/51, 52, 53; 112/277, 278; 364/513.5

[56] References Cited

U.S. PATENT DOCUMENTS 4,233,919  11/1980  Takahashi et al. .............. 112/277
4,256,047   3/1981  Suzuki et al. ................... 112/277
4,335,379   6/1982  Martin ............................. 381/51
4,359,714  11/1982  Tsunoda et al. ................ 381/51
4,375,329   3/1983  Park ................................ 381/51

OTHER PUBLICATIONS

MSC, "Give your equipment a voice . . . ", MSC brochure, 1974.

Primary Examiner—E. S. Matt Kemeny
Attorney, Agent, or Firm—Browdy and Neimark

[57] ABSTRACT

A diagnostic table which stores possible causes of certain abnormal conditions is accessed by corresponding push buttons for sequential vocalization by a sewing machine system, thereby helping the operator check the machine.

3 Claims, 14 Drawing Figures

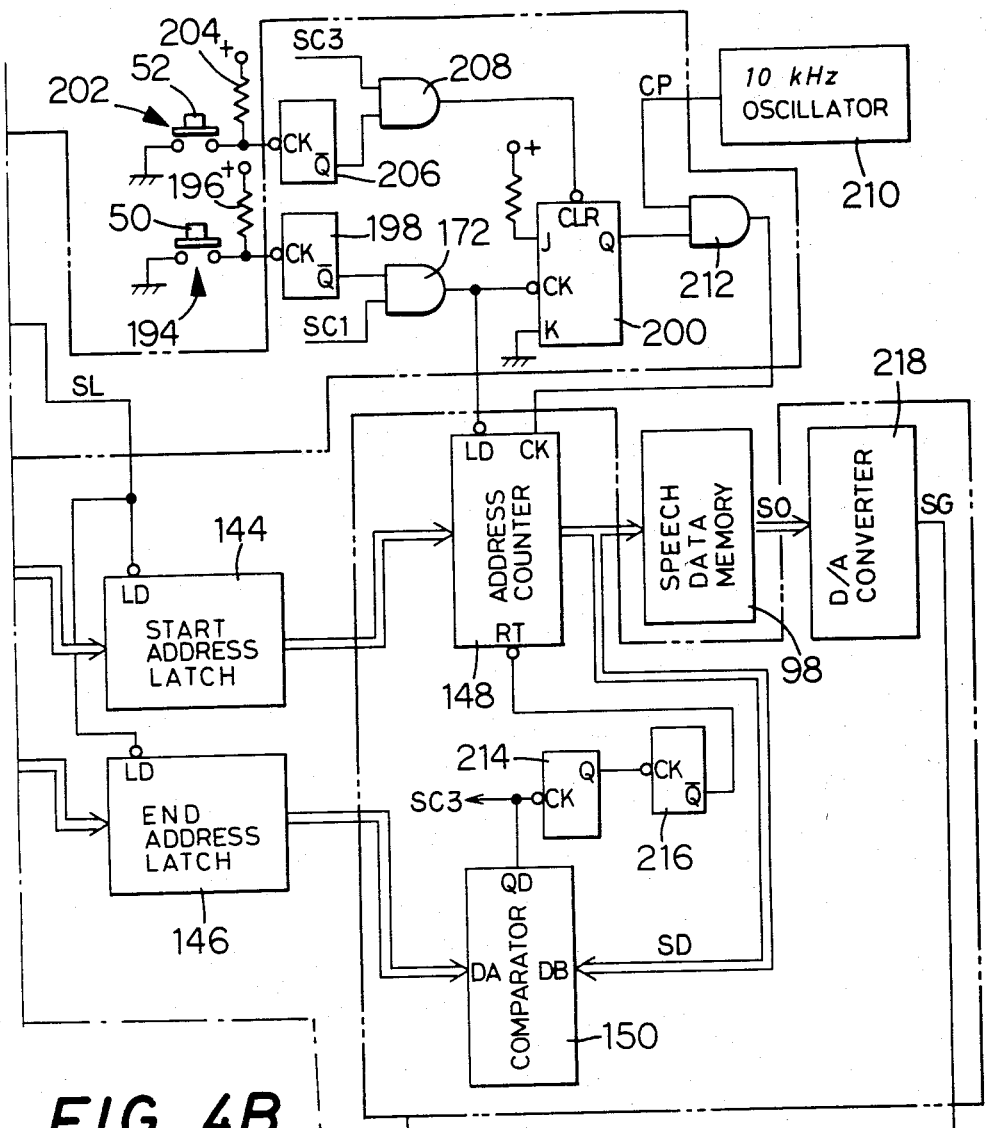
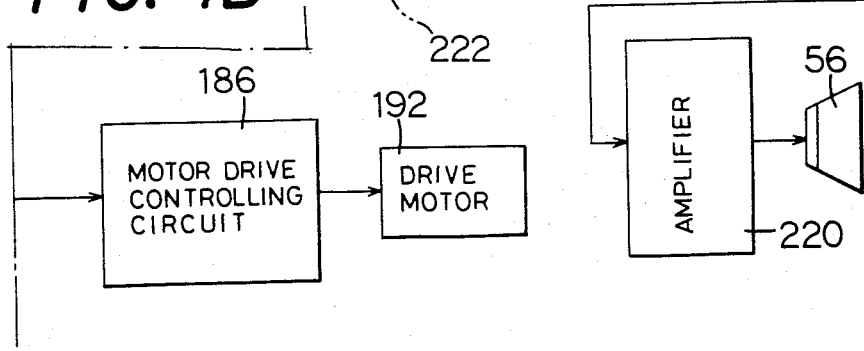
FIG. 4B

FIG. 13

| ADDRESS | SPEECH DATA (S0) | |
|---|---|---|
| START ADDRESS OF SPEECH DATA GROUPE VA (START ADDRESS OF SPEECH DATA GROUPE Va) END ADDRESS OF SPEECH DATA GROUPE Va | SPEECH DATA GROUPE Va | ⎫⎬⎭ SPEECH DATA GROUPE VA |
| START ADDRESS OF SPEECH DATA GROUPE Vb END ADDRESS OF SPEECH DATA GROUPE Vb | SPEECH DATA GROUPE Vb | |
| START ADDRESS OF SPEECH DATA GROUPE Vc END ADDRESS OF SPEECH DATA GROUPE VA (END ADDRESS OF SPEECH DATA GROUPE Vc) | SPEECH DATA GROUPE Vc | |
| | | ⎫⎬⎭ SPEECH DATA GROUPE VB |
| | | ⎫⎬⎭ SPEECH DATA GROUPE VC |
| | | ⎫⎬⎭ SPEECH DATA GROUPE VD |
| | | ⎫⎬⎭ SPEECH DATA GROUPE VE |

DEVICE FOR VOCALLY INDICATING CAUSES OF ABNORMAL CONDITIONS OF A SEWING MACHINE

BACKGROUND OF THE INVENTION

There are various possible abnormal conditions or irregularities taking place in a sewing machine, such as thread breakage, stitch skipping or stitch leaving out, needle breakage, etc. Causes thinkable for each of those abnormal conditions are generally plural, so an operator is usually obliged to check all of imaginable causes for each abnormal condition, so as to solve the problem of such abnormal conditions. This checking operation of the existence of those causes of abnormal conditions has been an extremely tiresome and time consuming work, because of multifunction of the sewing machine and a variety of such causes in recent days. This kind of checking performed with reference to an instruction manual booklet creates a great burden for the operator, particularly so for a household operator who is not so familiar with machinery.

SUMMARY OF THE INVENTION

It is a primary object of this invention, which was made from such a background, to provide a device for vocally indicating causes of abnormal conditions in a sewing machine, which is capable of vocally indicating contents related to causes of a plurality of abnormal conditions imaginable to take place in the machine.

For achieving the above-mentioned object, a device for vocally indicating causes of abnormal conditions of a sewing machine in accordance with this invention is provided with a memory which stores plural groups of speech data to vocally indicate or display contents related to at least one cause of each of abnormal conditions or irregularities taking place in a sewing machine, whereby when any abnormal condition occurs in the sewing machine a voice signal corresponding thereto is designated so that the operator can perceive the content of the cause of the abnormal condition through the voice.

As causes of irregularities in the sewing machine are indicated to the operator concretely and vocally, all that the operator has to do is to check the machine according to the content indicated in voice. It makes the checking work simple and efficient, and particularly relieves the operator unfamiliar to machinery from the heavy burden of the sewing machine handling.

BRIEF DESCRIPTION OF THE DRAWINGS

FIGS. 4A and 4B is a block diagram for showing a circuit structure in the first embodiment;

FIG. 13 is a table for showing a memory map of a data memory.

DETAILED DESCRIPTION OF THE PREFERRED EMBODIMENTS

With reference to the appended drawings the first embodiment will be described hereunder.

Figure 1:
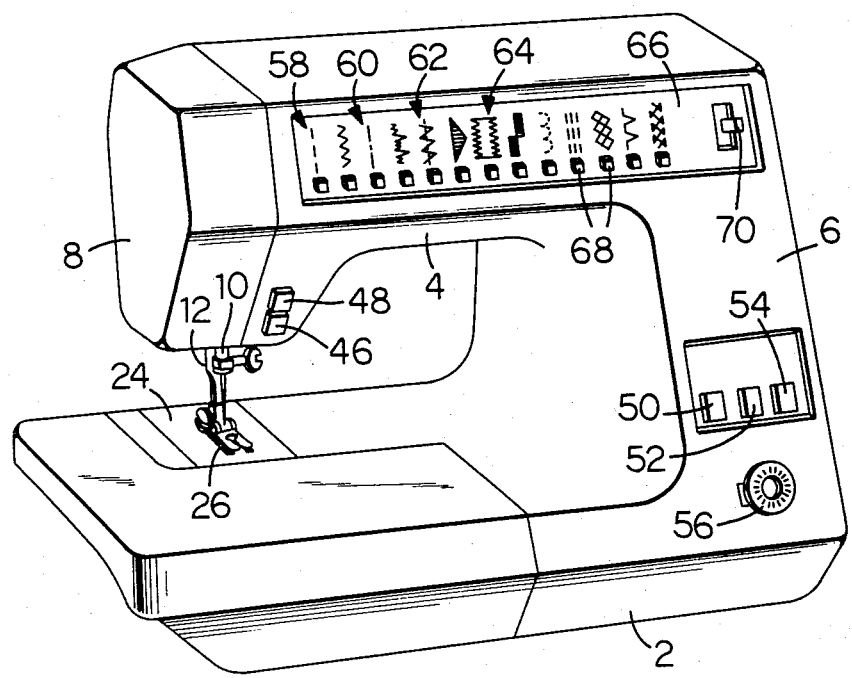
FIG. 1 is a general perspective view of a sewing machine in which a first embodiment of this invention is incorporated.
Figure 2:
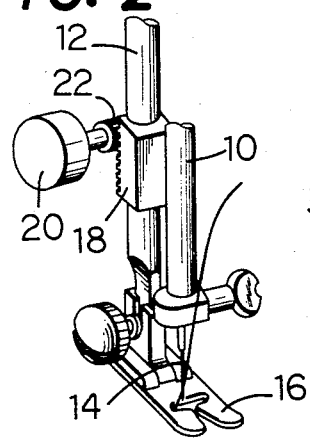
FIG. 2 is an enlarged view for showing the structure of a presser foot detector.

On a bed 2 of a machine frame a bracket arm 4 is, as can be seen in FIG. 1, horizontally disposed, being retained at one end thereof by a standard 6 in a cantilever status. On the free end side of the bracket arm 4 a head 8 is formed, in which a needle bar 10 vertically reciprocable and laterally oscillatable due to a known reciprocation mechanism and an oscillation mechanism (neither is shown), and a presser bar 12 movable up-and-down by operation of an operator are disposed. To the lower end of the needle bar 10 and the presser bar 12 a needle 14 and a presser foot 16 are respectively attached as shown in FIG. 2. To this presser bar 12 a rack 18 is secured, and a pinion 22, on the tip of whose rotary shaft a rotatable potentiometer 20 is fixed, is firmly disposed in the head 8 so as to engage with the aforementioned rack 18. Position of the presser foot 16 can be thereby electrically detected.

On the bed 2 just beneath the needle bar 10 a throat plate 24 is disposed, and in the middle portion thereof a feed dog 26 is placed for imparting a feed movement to a workpiece controlled by a not-shown but well-known feed regulating mechanism. The feed dog 26 and the needle bar 10, which constitute the stitch forming instrumentalities, enable relative movement between the needle 14 and the workpiece so as to form a desired stitch pattern on the workpiece.

Figure 3:
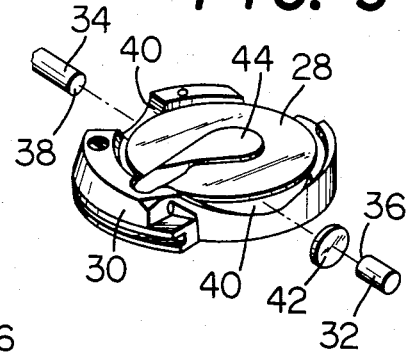
FIG. 3 is an enlarged view for showing the structure of a bobbin thread consumption detector.

Beneath the throat plate 24 a known mechanism for detecting bobbin thread consumption amount is disposed within the bed 2. On either side of a bobbin case 30 accommodating a bobbin 28 therein, as shown in FIG. 3, an optical fiber 32 for light projecting and an optical fiber 34 for light receiving are secured face-to-face at their respective end faces 36, 38. And the bobbin case 30 is provided with an opening 40 positioned on a straight line linking both end faces 36, 38, so as to pass light emitted from the end face 36 to the end face 38 when the bobbin thread wound on a bobbin 28 is decreased. Numeral 42 designates a convex lens and numeral 44 an arm for fixing the bobbin 28.

On the front side at a lower portion of the head 8 returning to FIG. 1 a start-stop push button 46 as a manual means for starting and stopping a drive motor 192 as a drive means and also for generating warning voice, and a back stitching push button 48 for forming a back stitch are disposed. On the front side at a lower portion of the standard 6 a speech repeat push button 50 as a manual button operable to repeat voice outputting such as warning statement, a speech stop push button 52 for stopping the voice outputting, and a cause speech push button 54 for outputting a cause of an abnormal condition in the machine are disposed. Beneath these push buttons (50, 52, 54) a speaker 56 as a warning means for speaking warning statement is disposed. On the front side of the bracket arm 4 a pattern display panel 66, on which symbols respectively representing thirteen kinds of stitch patterns such as straight stitching 58, basting 60, bar tacking 62, buttonhole stitching 64, etc. are displayed, is fixed. Beneath each of those symbols a pattern selection push button 68 is disposed, thirteen in all, to be operated for selecting a desired one stitch pattern out of the plurality. On the right side of the pattern display panel 66 a speech interrupt switch 70 for stopping any other sound than the abnormal condition warning voice in the machine is disposed.

Electric structure in a sewing machine with the above-mentioned make-up will be described hereunder with reference to FIG. 4.

Terminals on one side of switches 72 of automatic return type which each is closed by depressing of the pattern selection push button 68 are commonly ground, while terminals on the other side are respectively connected to a plus source via resistors 74 and to NAND gates 78 via inverters 76. A terminal of the speech interrupt switch 70 is grounded, while the other terminal thereof is connected via a resistor 80 to a plus source and also to the NAND gates 78 as well as a NAND gate 82. Furthermore, one terminal of a switch 84 of automatic return type which is closed in response to depressing of the cause speech push button 54 is grounded, while the other terminal is connected via a resistor 86 to a plus source and also to the NAND gate 82 via an inverter 88. While, therefore, the speech interrupt switch 70 is open, depressing of the pattern selection push button 68 will cause one of the thirteen signals from PS1 to PS13 corresponding to the push button 68 depressed to be selectively supplied from the NAND gates 78 to a pattern indication controlling circuit 90 as an "L" level signal. When on the other hand the cause speech push button 54 is depressed while the speech interrupt switch 70 is open, a cause speech command SSP is supplied from the NAND gate 82 to a sewing state indication controlling circuit 92. While the speech interrupt switch 70 is closed, however, each gate of the NAND gates 78 and 82 is closed so as to prevent outputting any of the signals PS1–PS13 and the cause speech command SSP.

Figure 5:
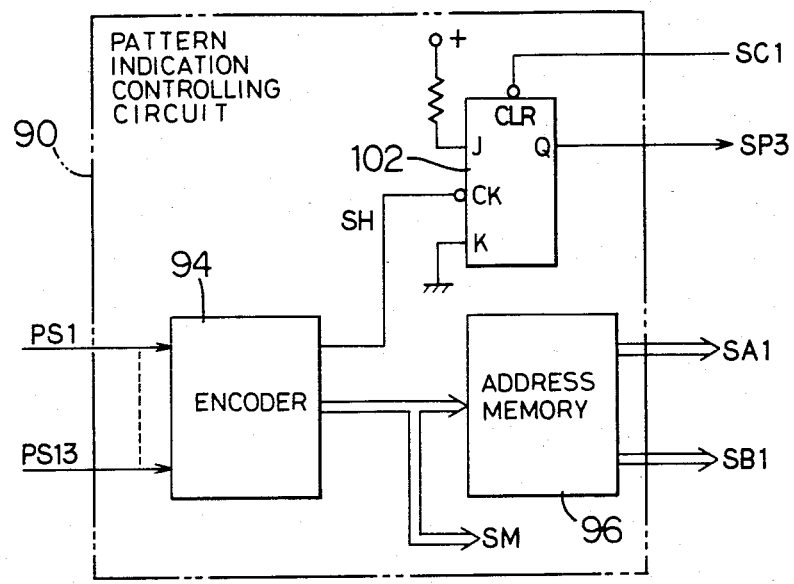
FIGS. 5 to 9 are respectively a block diagram for showing particularly detailed structure of a pattern indication controlling circuit, a sewing state indication controlling circuit, a warning indication controlling circuit, a timing logic circuit, and a motor drive commanding circuit in FIG. 4.

The pattern indication controlling circuit 90 is constructed as shown in the block diagram of FIG. 5. When any one of the signals PS1–PS13 is supplied to an encoder 94 a pattern code signal SM representing a selected stitch pattern is supplied to an address memory 96 and a known stitch data generator (not-shown) for positioning the needle bar 10 and a feed regulator. From the address memory 96 to input ports DA1 and DB1 of a multiplexor 100, supplied are a start address signal SA1 representing start address and an end address signal SB1 representing end address in a later described speech data memory 98 as a memory means for permanently storing speech data, wherein plural groups of corresponding speech data are stored for displaying stitch patterns represented by the supplied pattern code signal SM in the form of voice. When on the other hand the encoder 94 is supplied with any one of the signals PS1–PS13, it supplies in turn an operation signal SH of "L" level to a clock terminal CK of a flip-flop circuit 102. The circuit 102 becomes a set status by the supply of the operation signal SH so as to supply a port select signal SP3 of "H" level from an output terminal Q thereof to a port select terminal G1 of the multiplexor 100 and a later described timing logic circuit 104. This status of the flip-flop circuit 102 is maintained until a latch completion signal SC1 from the timing logic circuit 104 is supplied to a clear terminal CLR thereof.

The pattern indication controlling circuit 90 is therefore, for the purpose of displaying the selected stitch pattern by operation of the pattern selection push button 68 in the form of voice, to supply a corresponding start address signal SA1 and end address signal SB1 to the multiplexor 100.

Figure 6:
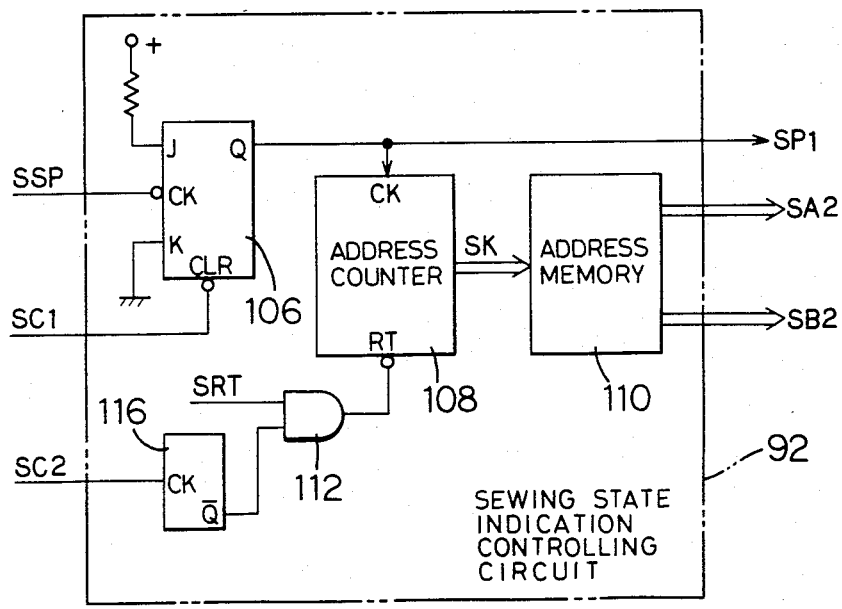

The sewing state indication controlling circuit 92 has a made-up illustrated in the block diagram of FIG. 6. More particularly describing, when a cause speech command SSP is supplied to a clock terminal CK of a flip-flop circuit 106, the latter is turned to a set state for supplying a port select signal SP1 of "H" level from its output terminal Q to a port select terminal G2 of the multiplexor 100, the timing logic circuit 104, and a clock terminal CK of an address counter 108. This status of the flip-flop circuit 106 is maintained until a latch completion signal SC1 is supplied to a clear terminal CLR thereof. The address counter 108 counts the port select signals SP1 and then supplies a signal SK representing the count content thereof to an address memory 110, and the count content is turned to zero by resetting the counter 108. When however the count content reaches "6" by counting the signals SP1 it is returned again to "1". In the memory 110, for indicating or displaying a cause of an abnormal condition in the form of voice in response to a supplied signal SK, a start address signal SA2 representing a start address of the speech data memory 98 and an end address signal SB2 representing an end address of the same are supplied to input ports DA2 and DB2 of the multiplexor 100. Besides, the address counter 108 is supplied to a reset terminal RT thereof with a power on timing signal SRT, i.e., a pulse signal of "L" level, by way of an AND gate 112, and at the same time it is also supplied with a drive command SC2 from a later described motor drive commanding circuit 114 by way of a monostable multivibrator 116 and the AND circuit 112. The address counter 108 is thereby to be reset when at least either one of the power on timing signal SRT and the drive command SC2 is generated.

The sewing state indication controlling circuit 92 functions therefore, for displaying in voice the contents and causes of six kinds of irregular sewing states one after another in response to the operation of the cause speech push button 54, to supply a corresponding start address signal SA2 and end address signal SB2 to the multiplexor 100.

In the invented sewing machine an overload detector 118, a bobbin thread consumption detector 120 and a presser foot detector 122 as means for detecting occurrence of an abnormal condition which hinders normal stitch forming and generating a signal telling the detection thereof, are disposed.

The overload detector 118 for the drive motor 192 is provided with a known mechanism for detecting, while the drive command SC2 is being output from the motor drive commanding circuit 114, rotational state of the drive shaft and outputting a detection signal SDT1 if the number of rotation of the drive shaft has not reached a normal amount. Structure of the bobbin thread consumption detector 120 is composed of a mechanism illustrated in FIG. 3, a light source, and a light receiving element. When the light receiving element received light emitted from the light source via both optical fibers 32, 34, a detection signal SDT2 is output. The presser foot detector 122 includes a circuit which compares an output voltage of the potentiometer 20 corresponding to an actual height of the presser bar 12 shown in FIG. 2 with a predetermined reference voltage, and when the output voltage of the potentiometer 20 exceeds the reference voltage a detection signal SDT3 is output. All of those abnormal detection signals of "L" level, SDT1, SDT2, and SDT3 are respectively supplied to a warning indication controlling circuit 124 and the motor drive commanding circuit 114.

Figure 7:
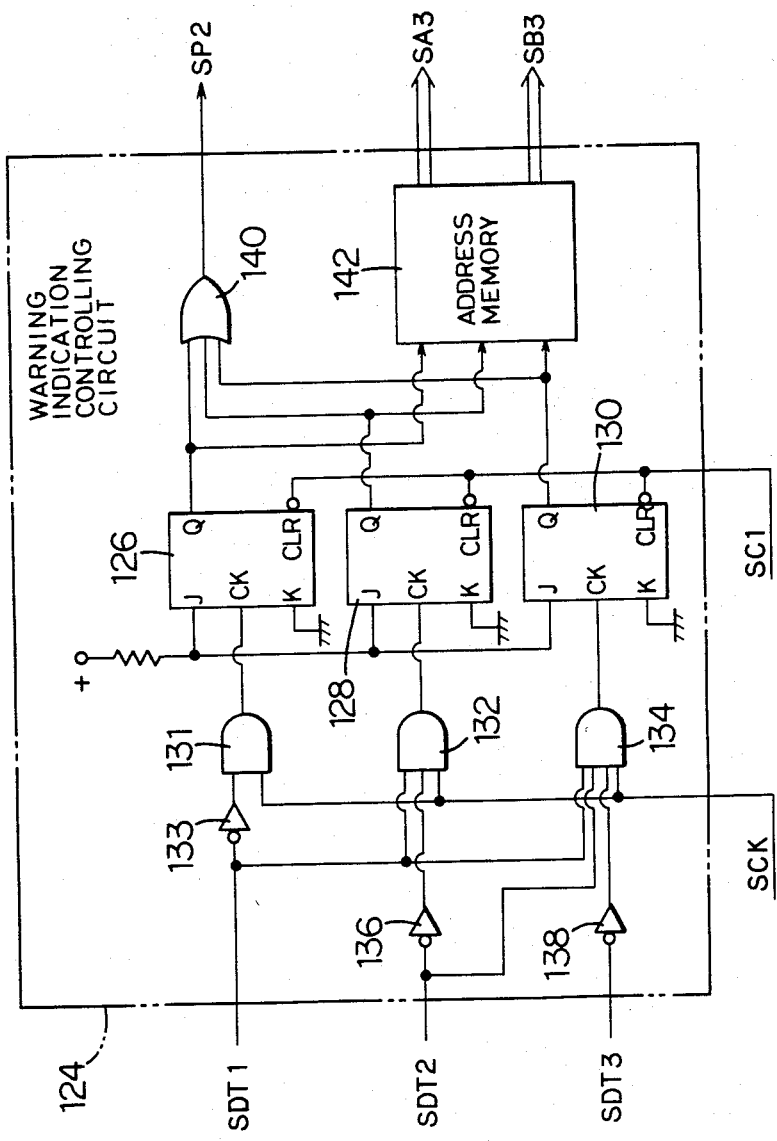

The warning indication controlling circuit 124, as means for actuating warning means in response to the operation of the foregoing manual means while abnormal condition is remaining, is constructed as shown in FIG. 7. The circuit 124 is provided with three flip-flop circuits 126, 128, and 130, wherein the latch completion signal SC1 is supplied to a respective clear terminal CLR thereof and a warning command SCK is supplied from the motor drive commanding circuit 114 to a respective clock terminal CK of the three flip-flop circuits 126, 128, and 130 by way of AND gates 131, 132, and 134. The detection signal SDT1 is respectively supplied via an inverter 133 and the AND gate 131 to a clock terminal CK of the flip-flop circuit 126, and via the AND gates 132 and 134 to clock terminals CK of the flip-flop circuits 128 and 130. The detection signal SDT2 is supplied via an inverter 136 and the AND gate 132 to a clock terminal CK of the flip-flop circuit 128, and via the AND gate 134 to a clock terminal CK of the flip-flop circuit 130. And the detection signal SDT3 is supplied via an inverter 138 and the AND gate 134 to a clock terminal CK of the flip-flop circuit 130. Output signals of "H" level representing set state of those flip-flop circuits 126, 128, and 130 are respectively supplied from an output terminal Q thereof to an OR gate 140 and an address memory 142. An output signal of the OR gate 140 is supplied as a port select signal SP2 to a port select terminal G3 of the multiplexor 100 and to the timing logic circuit 104. From the address memory 142, for displaying in voice an alarm respectively corresponding to the set state in the flip-flop circuits 126, 128, and 130, a start address signal SA3 representing a start address and an end address signal SB3 representing an end address in the speech data memory 98, where plural groups of speech data representing the alarms are stored, are supplied to input ports DA3 and DB3 of the multiplexor 100.

The warning indication controlling circuit 124 is therefore given a function, for the purpose of displaying the alarm contents corresponding to the detection signal SDT1, the detection signal SDT2 and the detection signal SDT3 in voice, to supply the start address signal SA3 and the end address signal SB3 to the multiplexor 100 when a warning command SCK is generated, and to allow priority to the detection signal SDT1 over other detection signals SDT2 and SDT3 and allow priority to the detection signal SDT2 over the detection signal SDT3 when all of these signals are generated at a time.

In the multiplexor 100, while the port select signal SP3 is being supplied to the port select terminal G1 thereof, the start address signal SA1 and the end address signal SB1, which are being supplied to the input ports DA1 and DB1, are output from output terminals QA and QB thereof to a start address latch 144 and an end address latch 146. While the port select signal SP1 is being supplied to the port select terminal G2 in a similar way, the start address signal SA2 and the end address signal SB2, which are being supplied to the input ports DA2 and DB2, are output. While further similarly the port select signal SP2 is being supplied to the port select terminal G3, the start address signal SA3 and the end address signal SB3 supplied to the input ports DA3 and DB3 are output.

In the start address latch 144 and the end address latch 146, when the load signal SL is supplied from the timing logic circuit 104, the signal supplied from the multiplexor 100 to the input terminals thereof is temporarily memorized, and the signals representing the memorized contents are respectively supplied to an address counter 148 and an input terminal DA of a later described comparator 150.

Figure 8:
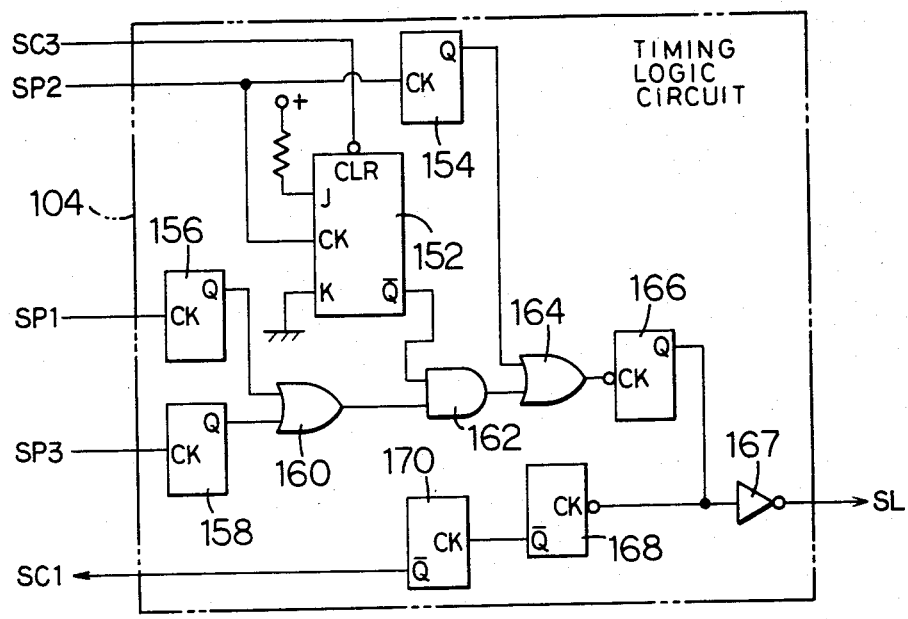

The timing logic circuit 104 is made up as shown in the block diagram of FIG. 8. There is a flip-flop circuit 152 provided therein, which receives a speech end signal SC3 from the comparator 150 at a clear terminal CLR thereof. The port select signal SP2 is supplied to a clock terminal CK of the flip-flop circuit 152 and a monostable multivibrator 154. The port select signals SP1 and SP3 are supplied via monostable multivibrators 156, 158 to an OR gate 160. An output signal of the OR gate 160 and an output signal of "H" level representing a reset state of the flip-flop 152 are supplied to an AND gate 162. An output signal from the AND gate 162 and an output signal from the monostable multivibrator 154 are supplied to an OR gate 164. An output signal from the OR gate 164 is supplied via a monostable multivibrator 166 and an inverter 167 to, as a load signal SL of "L" level, the start address latch 144 and the end address latch 146, and at the same time supplied via monostable multivibrators 166, 168, and 170 to, as a latch completion signal SC1 of "L" level, the pattern indication controlling circuit 90, the sewing state indication controlling circuit 92, the warning indication controlling circuit 124, and an AND gate 172. The timing logic circuit 104 functions therefore such that, when any one of the port select signals SP1, SP2, and SP3 is supplied a load signal SL is output after a certain time span respectively corresponding to output pulse width of each of monostable multivibrators 156, 154, and 158, and when the output of the load signal SL is finished a latch completion signal SC1 is output after a certain time span corresponding to output pulse width of a monostable multivibrator 168, and furthermore when the port select signal SP2 is supplied first, outputting of load signals SL and latch completion signals SC1 based on the later supplied port select signals SP3, SP1 is blocked until the vocal indication of warning is finished.

Figure 9:
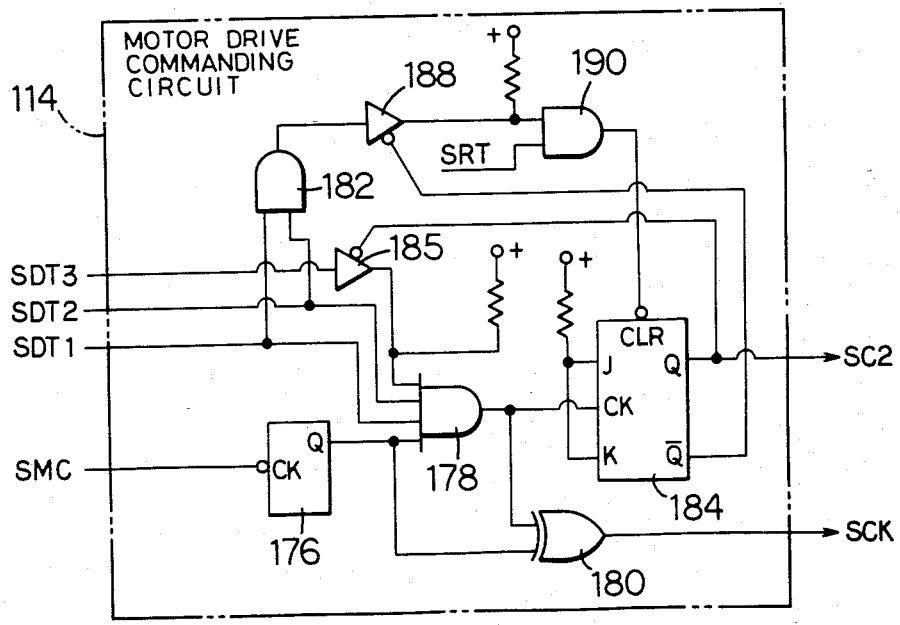

The motor drive commanding circuit 114, as means for inhibiting drive means from driving the stitch forming instrumentalities regardless of the operation of the foregoing manual means while detection signal is generated, is made up as shown in FIG. 9. From a switch 174 which is closed in response to depressing of the start-stop push button 46 of automatic return type an operation signal SMC of "L" level is suppplied via a monostable multivibrator 176 to an AND gate 178 and an exclusive OR gate 180, while the detection signal SDT1 and the detection signal SDT2 are respectively supplied to the AND gate 178 and an AND gate 182 on one hand. the detection signal SDT3 is supplied on the other hand by way of a tristate buffer 185, which is conducted when an output terminal Q of a flip-flop circuit 184 externally connected for being operable as a so-called binary circuit is at "L" level state, to the AND gate 178. An output signal of the AND gate 178 is supplied to a clock terminal CK of the flip-flop circuit 184 and the exclusive OR gate 180, and an output signal from the exclusive OR gate 180 is supplied as the warning command SCK to the warning indication controlling circuit 124. And the drive command SC2 of "H" level which represents a set state of the flip-flop circuit 184 is supplied from its output terminal Q to the motor drive controlling circuit 186 and the overload detector 118. An output signal of the AND gate 182 is supplied together with the power on timing signal SRT via a tri-state buffer 188, which is conducted when an output terminal $\overline{Q}$ of the flip-flop circuit 184 is at "L" level state, to an AND gate 190, and an output signal thereof is supplied in turn to a clear terminal CLR of the flip-flop circuit 184.

The motor drive commanding circuit 114 outputs, while none of the detection signal SDT1, the detection signal SDT2, or the detection signal SDT3 is supplied (that is to say a case all being of "H" level), alternately the drive command SC2 of "H" level and the stop command of "L" level at each inputting of the operation signal SMC; it outputs on the contrary, while any one of the detection signals SDT1, SDT2, and SDT3 is being supplied, the warning command SCK in response to inputting of the operation signal SMC and withdraws the output of the drive command SC2. If the detection signal SDT1 or the detection signal SDT2 is being output to the motor drive commanding circuit 114 the output of the drive command SC2 is ceased.

The above-mentioned motor drive controlling circuit 186 is a well known one which supplies power to the drive motor 192, while the drive command SC2 is being supplied, for driving the same at a preset speed.

As to a switch 194, one terminal thereof is grounded while the other is connected via a resistor 196 to a plus source as well as to a monostable multivibrator 198, whose output signal is supplied together with the latch completion signal SC1 to the AND gate 172. An output signal of the AND gate 172 is supplied to a clock terminal CK of a flip-flop circuit 200 and to a load terminal LD of the address counter 148.

One terminal of a switch 202, which is closed by depressing of the speech stop push button 52, is grounded while the other is connected via a resistor 204 to a plus source as well as to a monostable multivibrator 206, whose output signal is supplied together with the speech end signal SC3 to an AND gate 208. An output signal of the AND gate 208 is supplied to a clear terminal CLR of the flip-flop circuit 200. An output signal of "H" level representing a set state of the flip-flop circuit 200 is supplied together with a clock pulse CP output from an oscillator 210 to an AND gate 212, whose output signal is supplied to a clock terminal CK of the address counter 148.

When therefore the speech repeat push button 50 is depressed or the latch completion signal SC1 is generated the address counter 148 is loaded with an output signal of the start address latch 144, that is a start address signal, and a clock pulse CP is supplied to the clock terminal CK of the address counter 148, because the flip-flop circuit 200 is then at a set state. When however the speech stop push button 52 is depressed or the speech end signal SC3 is generated the flip-flop circuit 200 is cleared and the clock pulse CP is blocked by the AND circuit 212 thereby not to reach the address counter 148.

When the address counter 148 is supplied at its load terminal LD with a signal, an output signal of the start address latch 144 is loaded there. A value represented by this signal is added, by the clock pulse CP supplied to the input terminal thereof, through calculation, and a signal representing the calculated result is supplied to the speech data memory 98 and the input terminal DB of the comparator 150. This signal representing calculated contents functions as the address signal SD which designates one after another the speech data stored in the speech data memory 98.

In the comparator 150, when an end address signal supplied to an input terminal DA thereof is agreed with an address signal SD supplied to an input terminal DB thereof, a speech end signal SC3 of "L" level is supplied from an output terminal QD thereof to the timing logic circuit 104, and at the same time it is supplied via monostable multivibrators 214, 216 to a reset terminal RT of the address counter 148.

In the speech data memory 98 plural groups of speech data SO for vocal indication, as those listed in TABLE I as an example, are stored, and when an address signal SD is applied to the speech data memory 98 the speech data SO designated by the address signal SD is supplied to a D/A converter 218. As the speech data SO is a codified digital signal, it is converted in the D/A converter 218 to a voltage value which the speech data SO represents for being output. And a voice signal SG is approximately made by synthesizing the output signals from the D/A converter 218 represented by the corresponding group of speech data SO. This voice signal SG is supplied via an amplifier 220 to the speaker 56 for being vocally indicated therefrom. The speech data memory 98 and the D/A converter 218 constitute in this way a voice signal generator.

In the above description no concrete data or description about the digital data in the speech data memory 98 is provided, because the technology concerned to the digital data for the speech data is already known.

TABLE I

| No. | Statements of the Vocal Indication |
|---|---|
| 1 | "Straight Stitch. Use presser foot J." |
| 2 | "Basting. Use presser foot J, and lower the feed dog." |
| 3 | "Bar tacking. Use presser foot A, and lower the switch lever." |
| 4 | "Buttonhole stitching. Use presser foot A, and lower the switch lever." |
| 5 | "Don't feed the workpiece. Is not the feed dog lowered?" |
| 6 | "Is not the stitch length set at zero?" |
| 7 | "Is not the pressure adjusting lever set at zero?" |
| 8 | "Upper thread broken. Is not the way of thread stretching wrong?" |
| 9 | "Is not the thread tension too strong?" |
| 10 | "Is the needle attached rightly?" |
| 11 | "The machine has been locked. Read the instruction manual again." |
| 12 | "Bobbin thread is running short." |
| 13 | "Lower the presser foot." |

OPERATION OF THE EMBODIMENT

Operation of the embodiment will be described hereunder. When power is ON by a not-shown switch the circuit in FIG. 4 is energized. By virtue of a power on timing signal SRT the address counter 108 is reset and the flip-flop circuit 200 is cleared. At the same time the other flip-flop circuits 102, 106, 126, 128, 130, 152, and 184 are all cleared through a not-shown circuit.

When one of the stitch patterns, for example a straight stitching 58, is selected as desired by operating one of the pattern selection push buttons 68, a signal PS1 corresponding to the straight stitching is supplied to the pattern indication controlling circuit 90. A start address signal SA1, an end address signal SB1, and a port select signal SP3 for vocally indicating the straight stitching from the pattern indication controlling circuit 90 are thereby output. These start address signal SA1 and end address signal SB1 are supplied via the multiplexor 100 to the start address latch 144 and the end address latch 146. On the other hand a load signal SL is output from the timing logic circuit 104, after a certain time span from the generation of the port select signal SP3, causing the start address signal SA1 and the end address signal SB1 to be loaded in the start address latch 144 and the end address latch 146, and then to be supplied to the address counter 148 and the comparator 150. When a certain predetermined time has lapsed after the generation of the load signal SL, a latch completion signal SC1 is output from the timing logic circuit 104. The flip-flop circuit 200 is thereby set, and the start address signal SA1 is loaded in the address counter 148. And in the pattern indication controlling circuit 90 the flip-flop circuit 102 is cleared for restraining the output of the port select signal SP3. When the flip-flop circuit 200 is set the clock pulse CP is supplied via the AND gate 212 to the address counter 148, which adds the clock pulses CP one after another on the start address signal SA1 for outputting the count content as an address signal SD to the speech data memory 98 and the comparator 150. Speech data SO designated by the address signal SD are supplied one after another from the speech data memory 98 to the D/A converter 218 for being output therefrom as the voice signal SG. Vocal indication of the statement of No. 1 of TABLE I is started in this way as an output from the speaker 56. When the vocal indication is finished the content of the address signal SD comes to coincide with the end address signal SB1, causing the comparator 150 to output the speech end signal SC3. This results in clearance of the flip-flop circuit 200, followed by blocking the supply of the clock pulse CP with the AND gate 212, and resetting of the address counter 148 so as to make its content equal to zero, after a certain prdetermined time span from the generation of the speech end signal SC3.

When other stitch patterns, such as basting 60, bar tacking 62, or buttonhole stitching 64, are selected by operation of the pattern selection push button 68 a similar operation to the above will be executed respectively so as to vocally indicate the statements in TABLE I, No. 2, No. 3 and No. 4 in that order.

When the start-stop push button 46 is depressed in the above-mentioned status, the flip-flop circuit 184 is made a set state due to the operation signal SMC which is supplied by way of the monostable multivibrator 176 and the AND gate 178, and the drive command SC2 is output from the flip-flop circuit 184. The drive motor 192 is thereby driven, followed by driving of a not-shown needle bar oscillation mechanism and feed regulation mechanism. A desired stitch pattern selected by the depression of the pattern selection push button 68 can be formed thereby on the workpiece. If the start-stop push button 46 is depressed again the flip-flop circuit 184 is reversed so as to block the output of the drive command SC2, with a result of halting of the drive motor 192.

In the course of the above-mentioned sewing operation causes of various accidental abnormal conditions, for example malfeeding of the workpiece, upper thread breakage, etc. are indicated vocally by depressing of the cause speech push button 54. When this push button is depressed the flip-flop circuit 106 is placed under a set state due to a cause speech command SSP for supplying the port select signal SP1 from the output terminal Q thereof to the address counter 108, the multiplexer 100, and the timing logic circuit 104. In the address counter 108 the port select signal SP1 is counted until the content thereof becomes "1" before the signal SK representing the resultant content is supplied to the address memory 110, from which a start address signal SA2 and an end address signal SB2 corresponding to the signal SK are output for being supplied in turn via the multiplexor 100 to the start address latch 144 and the end address latch 146. From the timing logic circuit 104, on the other hand, a load signal SL and a latch completion signal SC1 corresponding to the generation of the port select signal SP1 are output in the same way to the above so as to produce a series of vocal indications from the speaker 56 in respect of the statement standing in TABLE I as No. 5. The flip-flop circuit 106 is cleared by the latch completion signal SC1. Re-depressing of the cause speech push button 54 at this time the counted content of the address counter 108 becomes "2" for performing a series of the vocal indications of the No. 6 statement of TABLE I from the speaker 56. Afterwards at each depressing of the cause speech push button 54 the vocal indications from No. 7 to No. 10 of TABLE I are performed one by one, and further depressing of the cause speech push button 54 will cause a vocal re-indication of No. 5 of TABLE I. The operator is allowed therefore to investigate various causes of irregularities without the trouble of consulting the instruction manual for the machine.

The above described operation of the pattern selection push button 68 and the cause speech push button 54 are concerned to a case wherein the speech interrupt switch 70 is open. When this speech interrupt switch 70 is closed, on the contrary, the NAND gates 78, 82 will restrain the output of their signals PS1-PS13 and the cause speech command SSP. In this case, therefore, generation of operation commanding voice signal is ceased, while generation of cause warning voice signal is permitted, so as to stop the vocal indication representing the contents of pattern selection operation and the causes of irregularities of sewing state in the machine. Skilled operators are thereby allowed release from troubles of unnecessary vocal indications by means of only operating the speech interrupt switch 70.

When the start-stop push button 46 is depressed, if any one of the detection signals SDT1, SDT2, or SDT3 is being in generation, an operation signal SMC which should be supplied to the flip-flop circuit 184 is blocked by the AND circuit 178. The flip-flop circuit 184 is not brought to a set state, with a result of restraining the output of the drive command SC2 therefrom. It means that the AND circuit 178 is a prohibiting circuit for preventing the start of stitch forming operation while any of the detection signals SDT1, SDT2, or SDT3 is being generated. As one input terminal of the exclusive OR gate 180 is of "H" level and the other is of "L" level, a warning command SCK therefrom is supplied to the warning indication controlling circuit 124. If for example a detection signal SDT1 is being generated in the warning indication controlling circuit 124, at this time, the flip-flop circuit 126 is to be brought to a set state, which will cause an output signal representing the set state thereof to be supplied via the OR gate 140 as a port select signal SP2 to the multiplexor 100 and the timing logic circuit 104, and further to the address memory 142. From this address memory 142 a start address signal SA3 and an end address signal SB3, which are corresponding to the detection signal SDT1, are ouput for being supplied via the multiplexor 100 to the start address latch 144 and the end address latch 146. In the timing logic circuit 104, after a certain predetermined time span from the supplying of a port select signal SP2, a load signal SL is output in a similar way to the above. After a certain predetermined time span from the output of the load signal SL a latch completion signal SC1 is output, and the flip-flop circuit 152 is placed at a set state. Even if, under this condition, other port selct signal SP1 or SP3 is supplied, a load signal SL and a latch completion signal SC1 based on the signal SP1 or SP3 can not be output by being blocked by the AND gate 162. In other words, the flip-flop circuit 152 and the AND gate 162 make the vocal indication of warning finish in preference to the vocal indication of causes of irregularities in respect of stitch patterns and sewing state. Vocal indication of No. 11 of TABLE I is performed thereafter in the same manner as above-mentioned. Depressing operation of the start-stop push button 46 while the detection signal SDT2 is being generated causes the supply of a warning command SCK from the motor drive commanding circuit 114 to the warning indication controlling circuit 124 according to a similar operation stated above. In this warning indication controlling circuit 124 vocal indication of No. 12 of TABLE I is performed after the flip-flop circuit 128 is placed at a set state according to a similar operation stated above. Depressing operation of the start-stop push button 46 while the detection signal SDT3 is being generated similarly brings the flip-flop circuit 130 to a set state for performing vocal indication of No. 13 of TABLE I.

When the detection signal SDT1 should be generated in lapping with the detection signal SDT2 or the detection signal SDT3, the AND gate 131 allows in the warning indication controlling circuit 124 only the flip-flop circuit 126 to be placed at a set state, and the AND gates 132, 134 block the flip-flops 128, 130 to be placed at a set state, for preferentially performing vocal indication of No. 11 of TABLE I. If lapped generation of the detection signal SDT2 and the detection signal SDT3 should occur the blocking of the AND gate 134 similarly allows only the flip-flop circuit 128 to be placed at a set state for performing vocal indication of No. 12 of TABLE I.

When the detection signal SDT1 or the detection signal SDT2 is generated while the drive motor 192 is in rotation, either one of the two is supplied, in the motor drive commanding circuit 114, to the flip-flop circuit 184 by way of the AND gate 182, the tristate buffer 188, and the AND gate 190. The flip-flop circuit 184 is thereby cleared to automatically stop the drive motor 192.

Even when the start-stop push button 46 is operated while the machine is in an abnormal condition, vocal warning is made in parallel with halting of rotation of the drive motor 192 in the above-mentioned manner, which enables prevention of continuing of machine operation under an abnormal condition. It even allows to take necessary steps for remedying the irregularities in advance. Furthermore, the vocal warning can surely be performed without being hindered by other pattern indication and sewing state indication, and an important vocal warning is given preference in indication to others when plural abnormal conditions take place in lapping. It allows proper treatments to be taken speedily and surely.

When the operator has missed in hearing contents of vocal indication or left something unheard, for example in No. 1 of TABLE I, all that he/she has to do is to depress the speech repeat push button 50 to reproduce the indication. When the speech repeat push button 50 is depressed an output signal of "L" level from the monostable multivibrator 198 is supplied via the AND gate 172 to the flip-flop circuit 200 and the address counter 148. The start address signal SA1 which is latched at the start address latch 144 for the vocal indication is loaded in the address counter 148. At the same time the flip-flop circuit 200 is placed at a set state, and a clock pulse CP is supplied from the oscillator 210 to the address counter 148 by way of the AND gate 212. According to a similar operation the vocal indication of the matter shown in No. 1 of TABLE I is to be repeated.

In this way the operator is allowed, even when he/she accidentally missed in hearing a vocal indication, to repeat it at need so as to accurately or surely catch the contents thereof.

When a vocal indication, for example No. 1 of TABLE I, is started, a skilled operator may be well aware of the second half of the content to be indicated, i.e., what kind of presser foot should be used. In such a case only the vocal indication of a stitch pattern selected, for the purpose of making sure what kind pattern has been selected, is sufficient, and in the half way of the vocal indication the speech stop push button 52 is operated. This operation causes an output signal of "L" level from the monostable multivibrator 206 to be supplied via the AND gate 208 to the flip-flop circuit 200. The flip-flop circuit 200 is thereby cleared so as to block the clock pulse CP which has been supplied from the oscillator 210 to the address counter 148 at the AND gate 212. Counting operation in the address counter 148 is therefore stopped to restrain the later vocal indication.

The vocal indication can thus be interrupted according to the necessity of the operator, so a skilled operator can be released of botheration of unnecessary vocal indication so as to start the sewing operation as early as he/she desires.

Figure 4A:
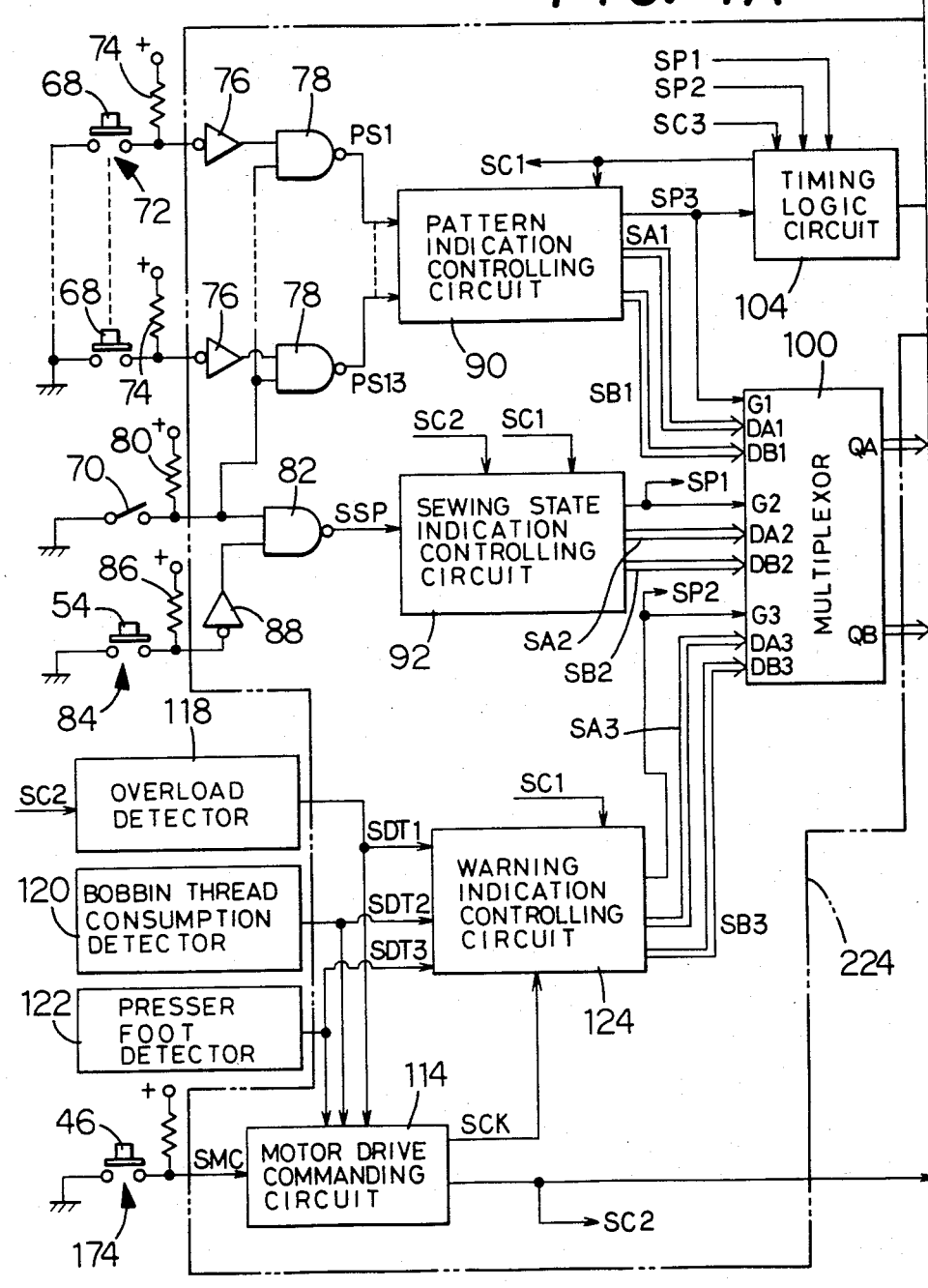

In the first embodiment described above, the address counter 148, the comparator 150, the monostable multivibrators 214, 216 and the D/A converter 218 constitute the voice synthesizer 222 as means for controlling memory means as shown in FIG. 4, and speech data stored in the speech data memory 98 are synthesized into voice according the PCM system, i.e., Pulse Code Modulation system. However, another type of voice synthesizing, for example, PARCOR, i.e., Partial Auto Correlation system is also permissible, wherein capacity of memory can be reduced to a great extent. In such a case, as voice synthesizer 222, HD 38880, an LSI of HITACHI SEISAKUSHO, LTD. (Japan) and TMCO 280, an LSI of TEXAS INSTRUMENT CORP. (U.S.A.) all well known as suitable.

In the circuit structure of FIG. 4 a data processing circuit 224 is composed of the pattern indication controlling circuit 90, the sewing state indication controlling circuit 92, the warning indication controlling circuit 124, the timing logic circuit 104, the motor drive commanding circuit 114, the multiplexor 100, the flip-flop circuit 200, the AND gates 78, 82, 172, 208, 212, the inverters 76, 88 and the monostable multivibrators 198, 206. This data processing circuit 224 may be constituted of a so-called microcomputer. In such a case, the start address latch 144 and the end address latch 146 may be generally constituted of a random access memory (RAM) and the speech data memory 98 is constituted of a read only memory (ROM).

Hereunder a second embodiment will be described with reference to the drawings.

In this embodiment only function of vocal indication is respect of causes of abnormal conditions or irregularities is imparted, omitting other functions of vocal indication given to the first embodiment. In the drawings related, identical parts and portions as those in the first embodiment are allotted the same signs and numerals.

Figure 10:
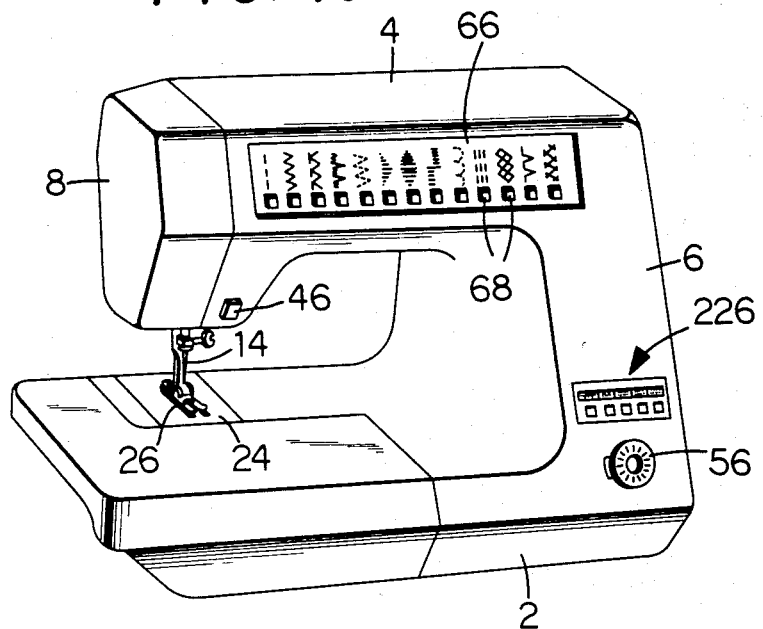
FIG. 10 is a general perspective view of a sewing machine in which a second embodiment of this invention is incorporated.
Figure 11:
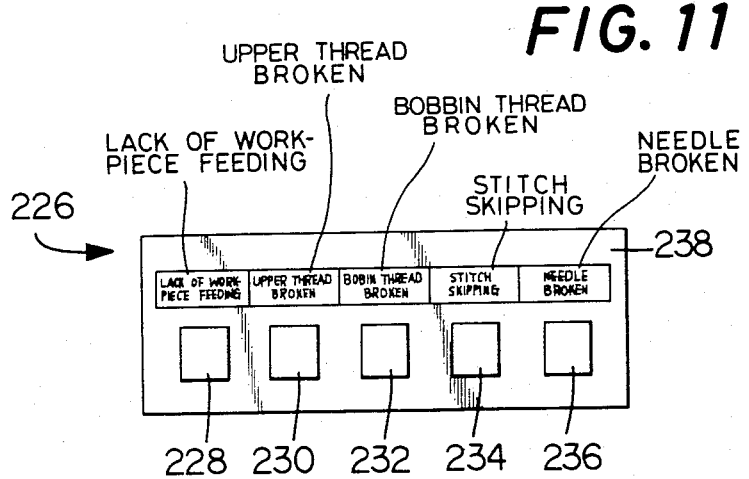
FIG. 11 is an enlarged view for showing the general view of an abnormal condition indicating device.

As can be seen in FIG. 10, the back stitching push button 48, the speech repeat push button 50, the speech stop push button 52, and the speech interrupt switch 70 are omitted, and an abnormal condition indicating device 226 provided with five push buttons 228, 230, 232, 234, and 236 as a manual means respectively operable to pick up each causes of abnormal conditions in sewing machine is installed in place of the cause speech push button 54 on the front side at a lower portion of the standard 6. The above-mentioned abnormal condition indicating device 226 further includes a display panel 238 which displys five kinds of abnormal conditions, that is to say "lack of workpiece feeding", "upper thread broken", "bobbin thread broken", "stitch skipping" and "needle broken", correspondingly to the five push buttons.

Figure 12:
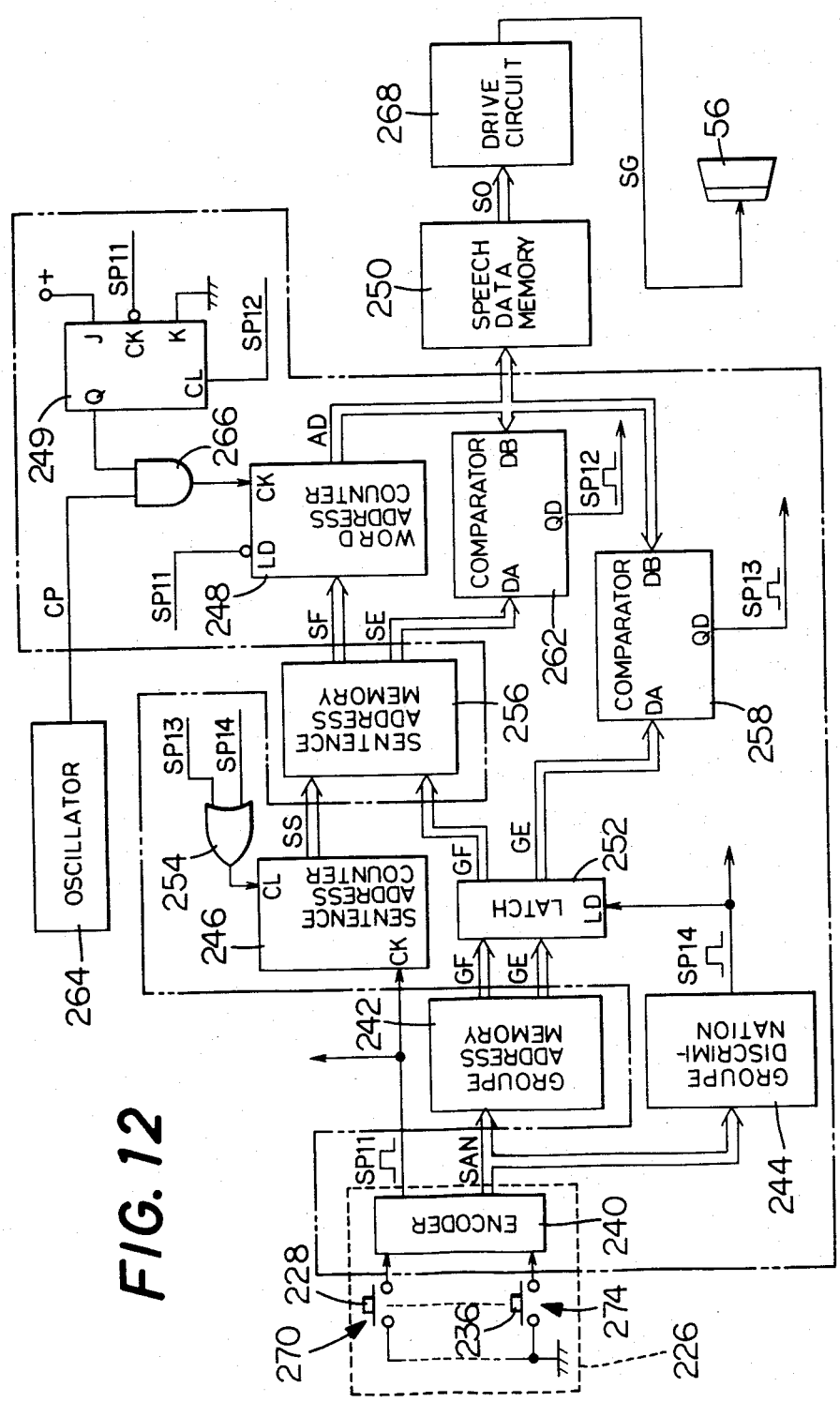
FIG. 12 is a block diagram for showing a circuit structure in the second embodiment.

In the machine frame illustrated in FIG. 10 a circuit illustrated in FIG. 12 is contained.

The five push buttons 228, 230, 232, 234, and 236 are respectively corresponding to five switches 270–274, all of the those being connected to an encoder 240. When the switches 270–274 are closed respectively by depressing of each corresponding push button 228, 230, 232, 234, or 236, the encoder 240 outputs an abnormal condition code signal SAN, representing an abnormal condition corresponding to a depressed push button, and an operation signal SP11 representing the depressing of the push button.

The abnormal condition code signal SAN is supplied to a group address memory 242 and a group discrimination 244, and the operation signal SP11 is supplied to a clock terminal CK of a sentence address counter 246, an input terminal LD of a word address counter 248, and a clock terminal CK of a flip-flop circuit 249.

In a data memory 250 as a memory means for permanently storing plural groups of speech data, speech data SO for vocally indicating statements listed in TABLE II are stored. Those speech data SO are divided into five groups, as shown in the memory map in FIG. 13, i.e., from VA to VE, corresponding to five kinds of abnormal conditions (irregularities) such as, "lack of workpiece feeding", "upper thread broken", "bobbin thread broken", "stitch skipping" and "needle broken". The speech data SO are subdivided in each group into sub-groups corresponding to statements listed in TABLE II. For example, in a group VA indicating the abnormal condition of "lack of workpiece" there are three sub-groups Va-Vc of speech data SO corresponding to the three messages in TABLE II.

TABLE II

| Irregularities | Statements |
| --- | --- |
| lack of workpiece feeding | "Is not the feed dog lowered?" "Is not the stitch length set at zero?" "Is not the pressure adjusting lever set at zero?" |

TABLE II-continued

| Irregularities | Statements |
| --- | --- |
| upper thread broken | "Is not the way of stretching of the upper thread wrong?" "Is not the thread tension too strong?" "Is the needle attached rightly?" |
| bobbin thread broken | "Is not the thread tension too strong?" "Is not the way of stretching of the bobbin thread wrong." |
| stitch skipping | "Is not the way of thread stretching wrong?" "Is the needle suitable for the workpiece and the thread attached rightly?" |
| needle broken | "Is the needle suitable for the workpiece and the thread attached rightly?" "Is not the thread stretched too strongly while being in a sewing operation?" |

Returning to FIG. 12, in the group address memory 242 each start address and end address of each group VA-VE of speech data SO stored in a speech data memory 250 are memorized, and start address signal GF and end address signal GE respectively representing a start address and an end address of groups corresponding to the contents of the input abnormal condition code signal SAN are respectively supplied to a latch 252.

In a group discrimination 244 contents of the previous abnormal condition code signal SAN output from the encoder 240 due to the abnormal condition indicating operation are to be memorized. When the contents of the input abnormal condition code signal SAN is unidentical with the content of the previous abnormal condition code signsl SAN a group change signal SP14 is output to an input terminal LD of the latch 252 and also to an input terminal CL of the sentence address counter 246 via an OR gate 254.

In the latch 252 the start address signal GF and the end address signal GE are, based on the group change signal SP14 supplied to the input terminal LD of the latch 252, temporarily memorized, and the start address signal GF and the end address signal GE as the contents of this memory are output for being applied to a sentence address memory 256 and a comparator 258. A sentence address counter 246 is provided with a function of clearance so as to clear what is memorized due to receiving of a signal at its input terminal CL. When the operation signals SP11 supplied to the input terminal CK thereof are counted, the counted content is output to be supplied to the sentence address memory 256 as a sentence number code signal SS. The sentence number code signal SS is used to designate one sub-group among the plural sub-groups of speech data SO respectively concerning causes of the corresponding abnormal condition, within each group VA-VE of the speech data SO memorized in the data memory 250.

In the sentence address memory 256, the start address and the end address of each of the sub-groups contained in each of the groups VA-VE of the speech data SO stored in the speech data memory 250 are memorized. And a sub-group of the speech data stored in the speech data memory 250 is specifically designated by the start address signal GF and the sentence number code signal SS. A sentence start address signal SF and a sentence end address signal SE, representing respectively the start address and the end address of that specified sub-group, are supplied to the word address counter 248 and a comparator 262.

In the word address counter 248, the signal SP11 applied to an input terminal LD thereof causes content of a sentence address signal SF to be loaded, so as to calculate by adding to the loaded content clock pulses CP supplied from an oscillator 264 via an AND gate 266 to a clock terminal CK thereof. The calculated content as an address signal AD is supplied one by one to the speech data memory 250, the comparator 258, and the comparator 262.

In the comparator 262, content of the sentence end address signal SE supplied to an input terminal DA thereof and content of the address signal AD supplied to an input terminal DB thereof are compared for supplying, when both contents are agreed, a sentence end signal SP12 to an input terminal CL of the flip-flop 249. Similarly in the comparator 258, when content of the end address signal GE supplied to an input terminal DA thereof and content of the address signal AD supplied to an input terminal DB thereof are agreed in comparison, a group end signal SP13 is supplied therefrom via the OR gate 254 to an input terminal CL of the sentence address counter 246.

The flip-flop circuit 249 is, by an operation signal SP11 input to a clock terminal CK thereof, brought to set state, and reset by a sentence end signal SP12 input to an input terminal CL thereof. As an output signal representing the set state is output from an output terminal Q thereof to an AND gate 266, a clock pulse CP is supplied to the word address counter 248 while the flip-flop circuit 249 is in set state.

In the speech data memory 250, speech data SO stored at a designated storage location by an input address signal AD are supplied one after another to a drive circuit 268. In other words, the above-mentioned circuit, which supplies the address signal AD to the speech data memory 250 in response to an operation of the abnormal condition indication device 226 which designates the abnormal condition, selects from among speech data stored in the speech data memory 250 a desired speech data group and also a speech data subgroup for generating them from the speech data memory 250 as outputs. It can therefore be said that the above-mentioned circuit constitute in fact a speech data selecting device.

In the drive circuit 268, consecutively input speech data SO are, in a similar manner as in the first embodiment, converted into voltage signals for being supplied, after having been electrically amplified as voice signals SG, to the speaker 56. The speaker 56 vocally indicates statements corresponding to the voice signals SG.

For vocally indicating the statements in TABLE II, the voice signal SG is approximately formed by synthesizing a series of input speech data SO in the drive circuit 268 which functions as a voice synthesizer. For this voice synthesizing either the PCM, Pulse Code Modulation, and PARCOR, Partial Auto Correlation, is employable.

Operation mode of this embodiment will be described hereunder.

When power is on by a not-shown switch, the flip-flop circuit 249 is reset for putting the machine in a ready status to a stitch forming operation.

When any abnormal condition or irregularity occurs in the machine to hinder smooth operation thereof, for example an imperfect feeding of a workpiece, the operator depresses the push button 228 for designating the abnormal condition.

The depressing of the push button 228 causes an abnormal condition code signal SAN representing the abnormal condition of "lack of workpiece feeding" to be supplied to the group address memory 242, and a start address signal GF and an end address signal GE respectively representing the start address and the end address of the speech data group VA corresponding to the designated abnormal condition are thereby supplied to the latch 252. At the same time the abnormal condition code signal SAN is supplied to the group discrimination 244. When an irregularity represented by the previous abnormal condition code signal SAN is unidentical with the irregularity "lack of workpiece feeding" of this time, a group change signal SP14 is supplied to the latch 252 so as to render the start address signal GF and the end address signal GE to be temporarily memorized therein, and the latched signals GF, GE are supplied to the sentence address memory 256 and the comparator 258.

On the other hand, the sentence address counter 246 is supplied, in response to the depressing of the push button 228, with an operation signal SP11 representing the depressing operation, and also with a group change signal SP14 by way of the OR gate 254 so as to make the calculation content zero. As a result of the above operation, based on a start address signal GF representing the start address of the speech data group VA corresponding to the irregularity of the "lack of workpiece feeding" and the sentence number code signal SS representing the zero of the calculation content, a sentence start address signal SF and a sentence end address signal SE, which respectively represent the start address and the end address of the first sub-group Va in the speech data group VA, are supplied from the sentence address memory 256 to the word address counter 248 and the comparator 262.

Releasing of the push button 228 at this condition will take place the flip-flop circuit 249, which is operated by the falling of the operation signal SP11, at a set state to supply a clock pulse CP to the word address counter 248, where content of the sentence start address signal SF is simultaneously loaded. In the word address counter 248 calculation of adding clock pulses CP on the content of the sentence start address signal SF is therefore performed, and the calculated content as the address signal AD is supplied one by one to the speech data memory 250, and the comparators 262, 258.

Therefore, speech data SO in one sub-group Va are sequentially supplied from the speech data memory 250 to the drive circuit 268, so as to make vocal indication, through the speaker 56, of the statement "Is not the feed dog lowered?" This is the first vocal indication expressing a cause of the irregularity "lack of workpiece feeding". At the termination of such a vocal indication the content of the address signal AD is agreed with the content of the sentence end address signal SE, so a sentence end signal SP12 is supplied from the comparator 262 to the flip-flop circuit 249 so as to reset the same. It results in interruption of supplying of a clock pulse CP by the action of the AND gate 266, followed by interruption of calculating operation in the word address counter 248.

Re-depressing of the push button 228 causes an abnormal condition code signal SAN of the same content to be supplied to the group discrimination 244 so as to restrain outputting of the group change signal SP14. The sentence address counter 246 counts therefore the number of operation signals SP11. The count content "1" representing a sentence number code signal SS is supplied to the sentence address memory 256 as a result.

In the sentence address memory 256, a sentence start address signal SF and a sentence end address SE representing the start address and the end address of the second sub-group Vb are output, based on the start address signal GF and the sentence number code signal SS.

As a result of the above operation the vocal indication of the statement "Is not the stitch length set at zero?" is carried out in the same manner as the previous description. This is the second vocal indication expressing a second cause of the irregularity "lack of workpiece feeding".

Further depressing of the push button 228 makes the sentence address counter 246 continue counting of the operation signals SP11, and the count content "2" as a sentence number code signal SS is supplied to the sentence address memory 256 for causing a sentence start address signal SF and a sentence end address signal SE respectively representing the start address and the end address of the third sub-group Vc to be output from the sentence address memory 256.

Vocal indication of "Is not the pressure adjusting lever set at zero?" will take place, as a result of the above, in the wake of the previous operation. This is the third vocal indication expressing a third cause of the irregularity "lack of workpiece feeding".

At the termination of the third vocal indication the content of the address signal AD is agreed with the content of the sentence end address signal SE and the end address signal GE, so a sentence end signal SP12 is output from the comparator 262 so as to reset the flip-flop circuit 249, and a group end signal SP13 is output from the comparator 258 to clear the count content of the sentence address counter 246. It means that the operational condition of the circuit shown in FIG. 12 is returned to a condition immediately before the initial depressing of the push button 228.

The above description was all concerned to depressing operation of the push button 228 related to the irregularity of "lack of workpiece feeding" in the machine. As to another case wherein any one of the other push buttons 230, 232, 234, or 236 is depressed in relation to the other irregularities, the previous description is similarly applicable. The remaining statements in TABLE II are respectively indicated in voice against the corresponding irregularity of the machine.

In the above second embodiment the push buttons 228, 230, 232, 234, and 236 are commonly used as the manual means for designating the irregularities in the machine and the manual means for commanding the vocal indication of causes of the irregularities. However, the latter manual means for indicating the causes in voice may be separately installed. In this instance, the manual means for commanding the vocal indication may be designed such that the then operation signal can replace the operation signal SP11 output from the encoder 240 in FIG. 12. It is also another alternative that means for controlling memory means encircled by a two-dot-chain line in FIG. 12 is replaced by a microcomputer, partially or wholly, for the purpose of miniaturization of the circuit in FIG. 12.

In the above second embodiment the operator is to press a push button, after the operator recognized an irregularity in the machine, corresponding to the kind of the irregularity. However, if the machine is provided with a plurality of detectors within the machine frame for detecting each of the irregularities, an optical indicating device disposed for designating a push button to be depressed among those 228-236 may optically designate, by means of letting it operate under a detection signal from the detectors, a push button corresponding to the happened irregularity.

All of the above description is concerned only to a couple of embodiments of this invention. It goes without saying that modifications and alterations can be made by those skilled in the art without departing from the spirit and scope of the invention.

As described in detail in the above, when an abnormal condition has happened in a sewing machine, all that the operator has to do is to depress a push button which designates the abnormal condition. Then causes imaginable for the abnormal condition are vocally indicated one after another, so the operator can check the causes according to what was vocally indicated, without consulting the instruction manual each time, which enables him/her to easily and efficiently solve the problem of the irregularity. It not only releases the operator from consulting the instrucion manual for each case, but also release an operator unfamiliar with machinery from the hardness of finding out causes of irregularities. Another merit resides in preventing the operator from mishearing or leaving unheard the content of the vocal indication, because the indication is made one by one at each depressing of the push button.

What is claimed is:

1. In a sewing machine, the improvement comprising a device for vocally indicating plural possible causes of each of plural different abnormal conditions which may take place in said sewing machine and which can be perceived by the operator, comprising:
   (a) memory means for permanently storing plural groups of speech data, each speech data group consisting of plural sub-groups which correspond to plural oral statements indicating said plural possible causes of said each of the abnormal sewing machine conditions, said each speech data group being related to one of cause groups each consisting of said plural possible causes, said each one cause group being supposed to cause each corresponding one of said abnormal sewing machine conditions;
   (b) plural operator-controlled buttons corresponding to said abnormal sewing machine conditions, each of said plural buttons being operable to designate one of said abnormal sewing machine conditions which is perceived by the operator, and to thereby pick up the cause group related to the designated abnormal sewing machine condition;
   (c) control means responsive to the operation of each of said plural buttons for controlling said memory means to output each of said plural groups of speech data;
   (d) means for emitting said oral statements indicating the plural possible causes of said designated abnormal sewing machine condition, based on the group of speech data output from said memory means,
   said each of the plural buttons being operable repeatedly to pick up one after another said plural possible causes of the cause group which is related to said abnormal sewing machine condition designated by said each of the plural buttons,
   said control means including means for sequentially designating said sub-groups of the speech data group related to said designated abnormal sewing machine condition in response to the repeated operations of said each of the plural buttons, thereby controlling said memory means to sequentially output the sequentially designated sub-groups of said speech data group, whereby said oral statements defined by said sub-groups of said each speech data group are provided by said emitting means upon said repeated operations of said each button.

2. In a sewing machine having stitch forming instrumentalities including a needle bar, a feed dog, a bobbin, a presser bar, and means for operating said needle bar and said feed dog, the improvement comprising a device for vocally indicating plural possible causes of each of plural different abnormal conditions which are associated with said stitch forming instrumentalities and which can be perceived by the operator, comprising:

(a) memory means for permanently storing plural groups of speech data, each speech data group consisting of plural sub-groups which correspond to plural oral statements to indicate said plural possible causes of said each of the abnormal conditions, said each speech data group being related to one of cause groups each consisting of the plural causes which are to be checked by the operator to remedy said each of the abnormal conditions;

(b) plural operator-controlled buttons corresponding to said abnormal conditions, each of said plural buttons being operable to designate one of said abnormal conditions which is perceived by the operator, and to thereby pick up the cause group related to the designated abnormal condition, said each of the plural buttons being repeatedly depressed to pick up, one after another, said plural possible causes of the cause group which is related to said abnormal condition designated by said each button;

(c) control means responsive to the operation of each of said plural buttons for controlling said memory means to output each of said plural groups of speech data, said control means including means for sequentially designating said sub-groups of the speech data group related to said designated abnormal condition in response to the repeated depression of said each of the plural buttons, thereby controlling said memory means to sequentially output the sequentially designated sub-groups of said speech data group; and (d) means for emitting said oral statements indicating the plural causes of said designated abnormal condition, based on the group of speech data output from said memory means, said emitting means being responsive to said sequentially designating means of said control means, and upon said repeated depressions of said each button, emitting said oral statements defined by said sub-groups of said each speech data group.

3. A method of vocally indicating plural possible causes of each of plural different abnormal conditions of a sewing machine which has stitch forming instrumentalities including a needle bar, a feed dog, a bobbin, a presser bar, and means for operating said needle bar and said feed dog, the abnormal conditions being associated with said stitch forming instrumentalities, said method comprising the steps of:

(a) storing in memory means of the sewing machine plural groups of speech data each consisting of plural sub-groups which correspond to plural oral statements to indicate said plural possible causes of said each of the abnormal conditions, such that said each speech data group corresponds to each of cause groups, said each cause group consisting of the plural causes which are to be checked by the operator to remedy said each of the abnormal conditions;

(b) designating one of said abnormal conditions which is perceived by the operator, by operating corresponding one of plural operator-controlled buttons of the machine which correspond to said abnormal conditions;

(c) sequentially designating said sub-groups of the group of speech data which is related to the designated abnormal condition, by repeatedly depressing said corresponding one of the plural buttons;

(d) outputting said sub-groups of the speech data group from said memory means in response to the repeated depression of said corresponding one of the plural buttons; and (e) emittng said oral statements indicating the plural causes of said designated abnormal condition, based on said sub-groups of the speech data group output from said memory means upon said repeated depressions of said corresponding one of the plural buttons.

* * * * *